Oct. 23, 1951     E. KIRÁLY     2,572,161
INDEXING HEAD

Filed May 28, 1948     4 Sheets-Sheet 1

INVENTOR.
ENDRE KIRÁLY
BY Burton & Parker
ATTORNEYS.

Oct. 23, 1951      E. KIRÁLY      2,572,161
INDEXING HEAD

Filed May 28, 1948      4 Sheets-Sheet 2

INVENTOR.
ENDRE KIRÁLY
BY Burton & Parker
ATTORNEYS.

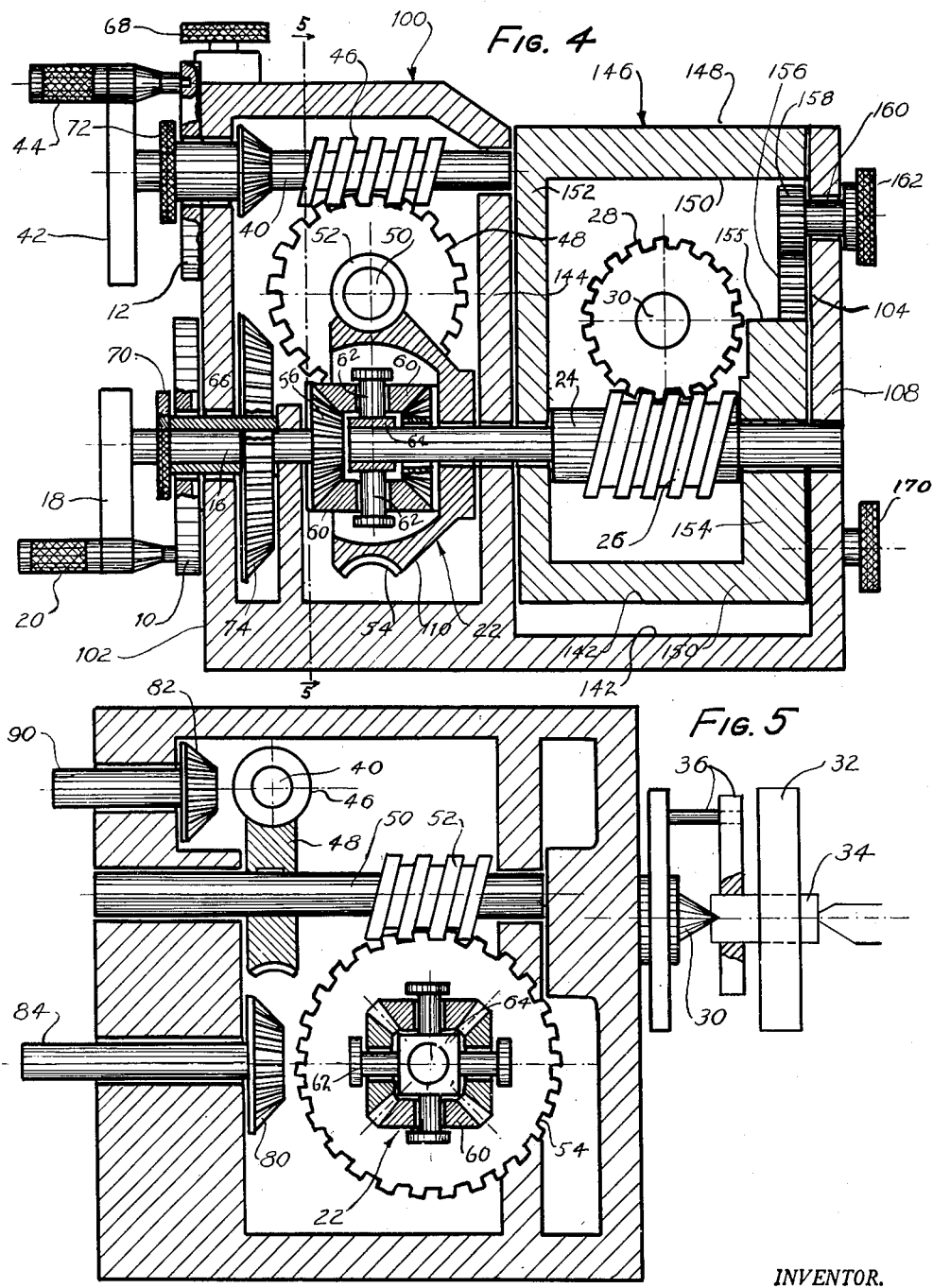

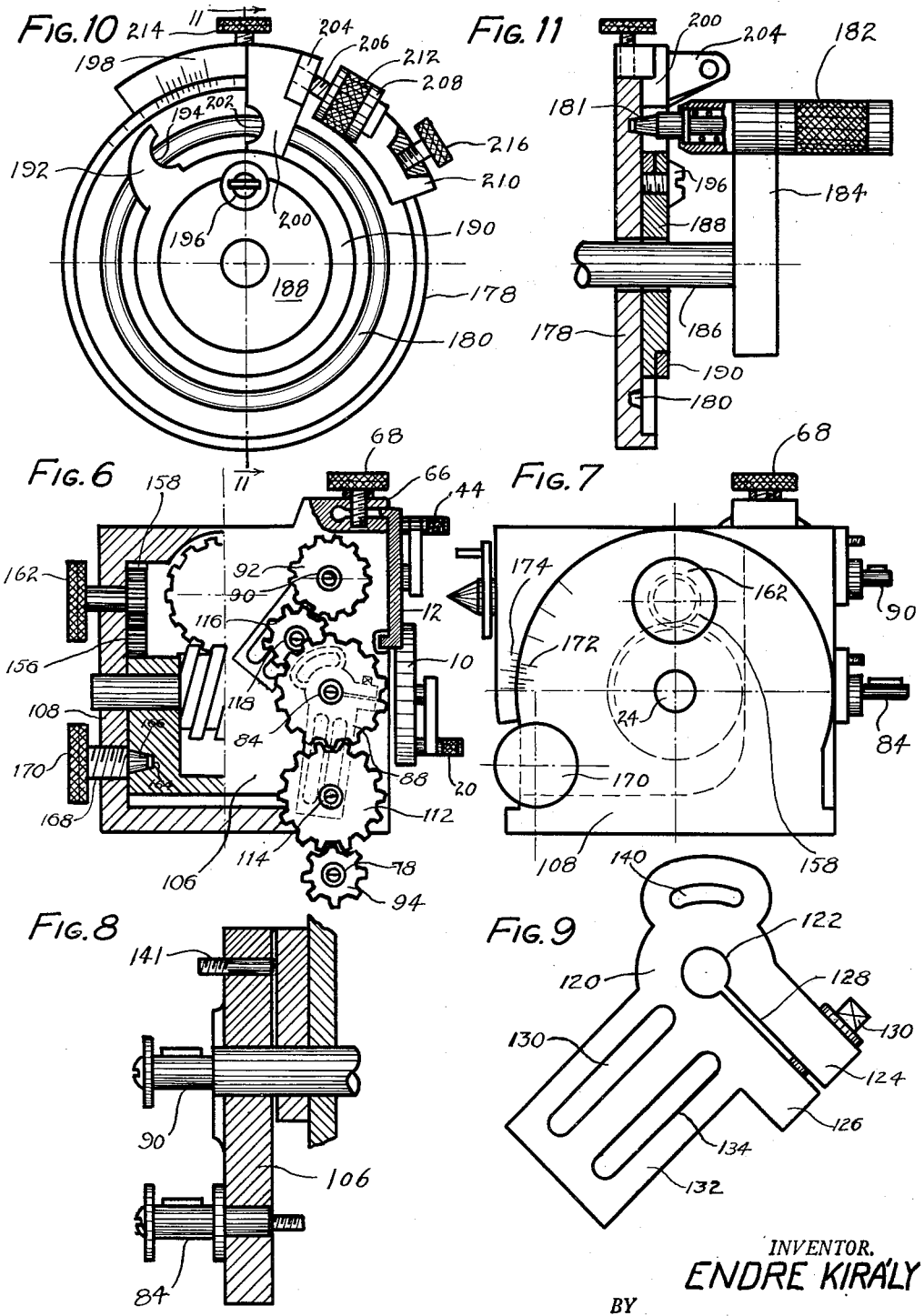

Patented Oct. 23, 1951

2,572,161

UNITED STATES PATENT OFFICE 2,572,161

INDEXING HEAD

Endre Király, Ujpest, Hungary, assignor to
Dezso D. Sekely, Ann Arbor, Mich.

Application May 28, 1948, Serial No. 29,785

5 Claims. (Cl. 90—57)

This invention relates to indexing instruments and particularly to an indexing head adapted for use on milling machines and the like for indexing and inspection work and for the cutting of gear teeth.

An important object of this invention is to provide an improved indexing head for use on milling machines and the like adapted to control a blank for shaping or cutting teeth thereon and for inspection, testing and other uses. Another important object of this invention is to provide a novel device of this character which provides rapid and accurate indexing and makes it unnecessary to change the index plates as heretofore has been the practice. Another important object of the invention is to provide an improved device of this character which is adapted for precision workmanship and is adapted to divide a circle into extremely small parts and which is further adapted to cut very small angles for the formation of bevel, helical and other special gearing and machine parts.

In carrying out the invention, the indexing head of this invention is provided with two indexing plates and associated controls therefor, one of which is operatively connected in a novel manner into the control exercised by the other and superimposes its adjustment thereon. As a result of the novel provision operatively coupling these two control mechanisms together it is possible to use the same indexing plates for all purposes and to machine standard as well as odd sizes and shapes of gear teeth.

An important feature of the invention is the provision of a novel means which enables the indexing head to be operated automatically from the machine with which it is associated, which means forms a part of the indexing head and is removable as a unit therewith. Another important feature of the invention is the provision and optional use of indexing plates having either a circular series of holes or a single circular groove provided with a micrometer adjustment.

Figure 1:
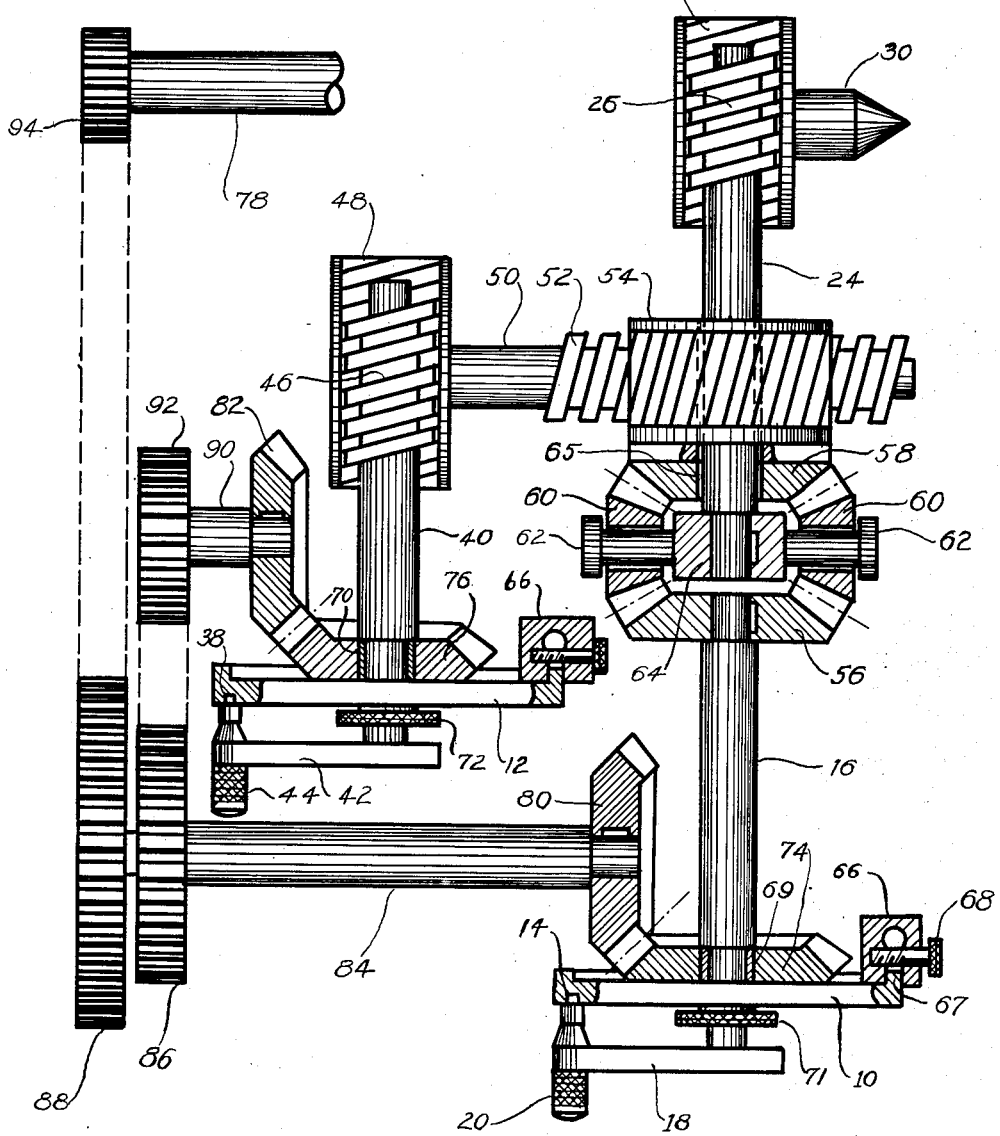
Figure 2:
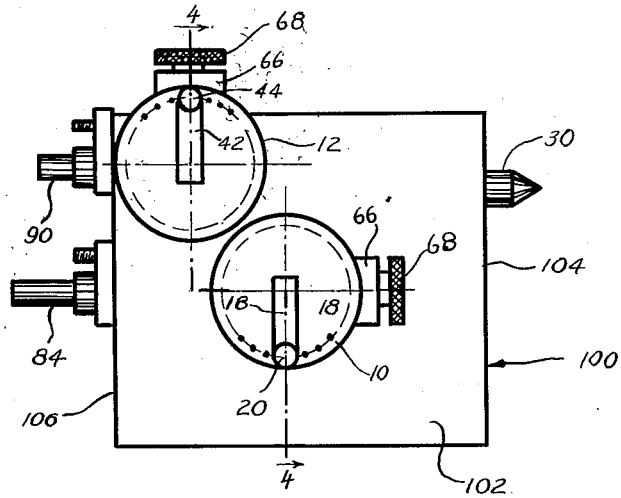
Figure 3:
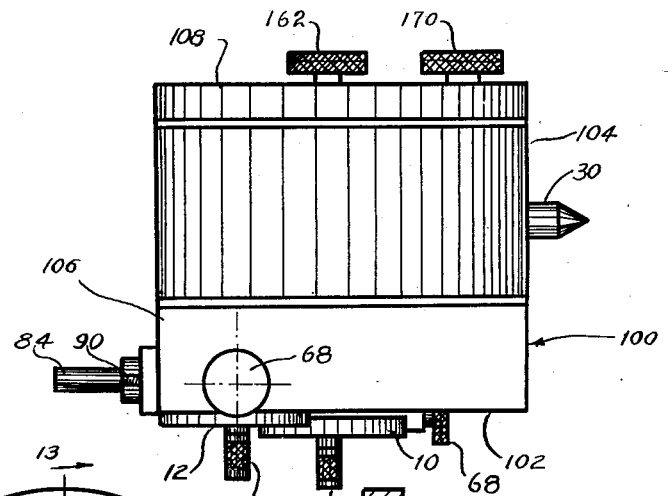
Figure 12:
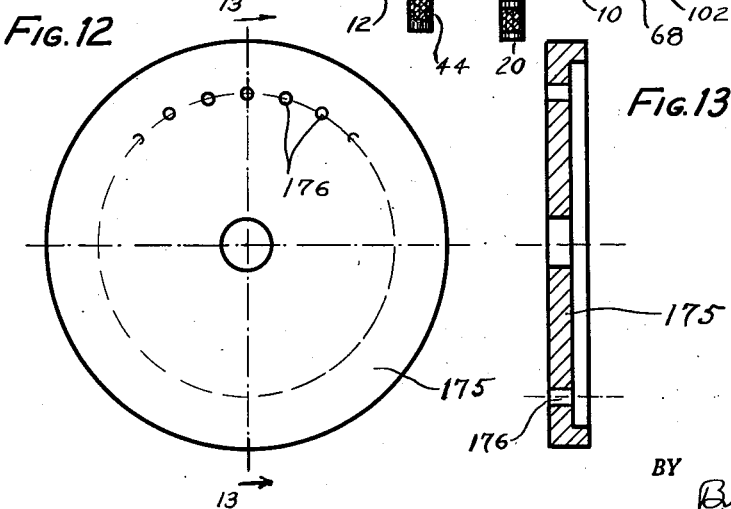
Figure 13:
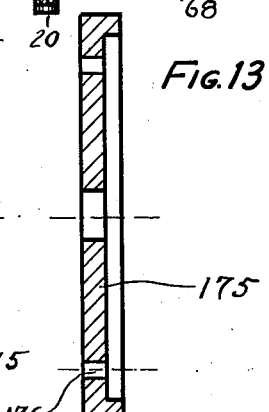

Various other objects, advantages and important features of this invention will become more fully apparent from the following specification, appended claims and accompanying drawings, wherein:

Fig. 1 is a schematic view illustrating the general relation of the parts of the indexing head of this invention, Fig. 2 is a front elevation of an indexing head embodying the features of the invention, Fig. 3 is a top plane view of the indexing head shown in Fig. 2, Fig. 4 is a vertical sectional view through an indexing head taken along line 4—4 of Fig. 2, Fig. 5 is a vertical sectional view taken along line 5—5 of Fig. 4, Fig. 6 is a side elevation of the indexing head, partly in section, Fig. 7 is a back elevation of the indexing head, Fig. 8 is detail side view of the gear drive mechanism showing its mounting on the head, Fig. 9 is a plane of a supporting member for the gear drive mechanism, Fig. 10 is a plane view of a modified form of indexing plate employing a micrometer, Fig. 11 is a sectional view of the indexing plate of Fig. 10, Fig. 12 is a plane view of an indexing plate having a hundred hole circle, and Fig. 13 is a sectional view of the indexing plate of Fig. 12.

Referring to the schematic showing in Fig. 1, two indexing plates indicated generally at 10 and 12 are illustrated. Indexing plate 10 is the initial operating plate and may be constructed of conventional form having a circular series of holes, one of which is indicated at 14, or it may be constructed as shown in Figs. 10 and 11 for micrometer scale adjustment. Extending through the plate 10 is a shaft 16. The outer end of the shaft 16 is provided with a crank arm 18 to which a retractable knurled handle 20 is attached. The handle 20 is provided with a spring loaded locking pin on the inner end thereof which is urged in the direction to enter any one of the holes 14. Through the intermediary of a differential gear system generally indicated at 22, which will be described in more detail hereinafter, shaft 16 drives an aligned shaft 24 located on the opposite side of the differential. This last shaft operates through a worm 26 and worm gear 28 to drive a spindle 30 upon which a blank to be cut or indexed is fixed. The blank may be a gear blank shown at 32 in Fig. 5 mounted as in conventional practice upon a shaft 34 clutched by a dog 36 to the tapered end section of the spindle 30. The handle controlled shaft 16 normally rotates freely in the index plate 10 but the two may be operatively coupled together for joint rotation as will be later described.

The second or supplemental index plate 12 is likewise provided with a circular series of holes, one of which is shown at 38 or it may be provided with a micrometer scale adjustment of the character illustrated in Figs. 10 and 11. A shaft 40 corresponding to shaft 16 extends through the index plate 12 and is normally freely rotatable relative thereto. The outer end of the shaft 40 carries a handle mechanism similar to that previously described including a crank arm 42 having a retractable knurled handle 44. The reduced inner end of the handle 44 is engageable to any one of the circular series of holes 38 and spring means in the handle yieldingly urges the same in the direction to enter the holes of the index plate.

Through a mechanical connection which may comprise alternate sets of worm and worm gears, the shaft 40 is operatively coupled to the shaft 24. For this purpose, shaft 40 is provided with a worm 46 meshing with a worm gear 48 which in turn through an auxiliary shaft 50 drives a worm 52 meshing with a worm gear 54. This last gear is co-axially but freely rotatable on the shaft 24.

The differential gear system generally indicated at 22 comprises two opposed sun gears in the form of bevel gears 56 and 58 co-axially related to the two shafts 16 and 24 and two or more smaller differential or planetary gears in the form of beveled gears 60, each rotatable about a revolvable spindle 62 extending perpendicularly to the common axis of the gears 56 and 58. The spindles 62 of the differential gears 60 are secured at their inner ends to a member 64 keyed or otherwise fixed to the inner end of the shaft 24. The latter extends through the beveled gear 58 and the two are independently rotatable relative to one another and for this purpose a bearing 65 is interposed therebetween. The handle controlled shaft 16 is keyed to the large beveled gear 56 of the differential for joint rotation therewith. The worm gear 54 is fixed to the opposite large beveled gear 58 of the differential in any suitable manner for joint rotation therewith, such as by being welded thereto or by the provision of connecting bolts.

As a result of a structure thus far described, it is evident that rotation of either handle 20 or 44, or both handles together, will impart a turning movement to the headstock spindle 30 to which the blank to be indexed or shaped is secured. The gear reduction formed by the various worms or worm gear assemblies and the differential is such that any turning movement of either handle will impart a proportional small turning movement to the spindle 30. For example, the differential 22 provides a two to one ratio between the handle shaft 16 and the driven shaft 24. If the gear ratio between the worm 26 and the worm gear 28 is thirty to one then the ratio between the handle shaft 16 and the spindle 30 is sixty to one. Therefore, sixty complete revolutions of the handle 20 will impart one complete revolution to the spindle 30.

The two worm and worm gear assemblies between the handle shaft 40 and the shaft 24 considerably reduce the turning movement applied to the handle 44. Any suitable gear reduction ratio may be employed. If, for example, the gear ratio between the worm 46 and the worm gear 48 is ten to one and the gear ratio between the worm 52 and the worm gear 54 is twenty to one, the resulting gear reduction is such that the handle 44 will have to be rotated two hundred times to make one complete revolution of the gear 54 of the differential. The differential 22 and worm gears 26 and 28 respectively further reduce this turing movement by the sixty to one ratio which as previously described may exist therebetween.

With the heretofore described proportions existing between the two indexing plates 10 and 12, it is possible to divide a circle into very small increments and to machine or cut special teeth without replacing any of the indexing plates. Index plate 10, as previously described, is first used in the indexing operation and if the rotatable adjustment of the handle shaft 16 is not sufficiently accurate for the purpose it is adjusted to the approximate desired amount. Thereafter the index plate 12 and the handle shaft 40 associated therewith is employed to obtain the final accurate adjustment of the blank controlling spindle 30. During the turning of either handle 20 or 44, the other handle is spring urged into locking engagement with any one of the holes in the index plate with which it is associated thereby holding the same against turning movement Therefore only one of the two larger bevel gears 56 or 58 of the differential will turn while the other is held against movement.

As previously inferred each index plate 10 and 12 is mounted for rotation about the axis of the central shaft with which it is associated. To hold each plate against rotation there is provided any suitable releasable friction clamping mechanism such as that illustrated in Fig. 1. The clamping device for each index plate comprises a stationary U-shaped member 66 having the opposite free ends thereof yieldingly movable inwardly toward one another and mounted in embracing relationship to an inwardly projecting circular flange or rib 67 on the index plate. A threaded member or set screw 68 extending through the ends of the U-shaped member beyond the rib will, when rotated in one direction, draw the ends compressibly into engagement with the opposite sides of the rib and hold the index plate against rotation. A similar clamping means is provided for each index plate.

As previously indicated, the two shafts 16 and 40 are normally independently rotatable relative to their respective indexing plates. However, the two index plates may be coupled to their respective shafts for joint rotation when it is desired to automatically operate the moving parts of the index unit from the milling machine or other instrumentality upon which it is used. To this end, the outer end sections of both shafts 16 and 40 are reduced. A sleeve is provided for each shaft over the reduced end thereof. The sleeve for shaft 16 is indicated at 69; the sleeve for shaft 40 is indicated at 70. Each sleeve extends through the index plate with which it is associated and its outer projecting end is externally threaded. A knurled ring member threaded upon the projecting end of each sleeve will upon being threaded in a tightening direction frictionally hold the plate to the sleeve for joint rotation. The ring member for the sleeve 69 is shown at 71; and the ring member for the sleeve 70 is shown at 72. Fixed to each sleeve on the inside of each index plate is a beveled gear, the beveled gear for the sleeve 69 being indicated at 74 and the beveled gear for the sleeve 70 at 76. With either handle 20 or 44 locked in a hole in its index plate and the U-shaped clamping device 66 released, the index plate, handle shaft and beveled gear will rotate as a unit.

The two beveled gears 74 and 76 are operatively coupled with the feed shaft or lead screw for the milling machine table indicated at 78. Suitable reduction gearing is provided for this purpose to drive the shafts 16 and 40 at the desired ratios. For this purpose, the beveled gear 74 and 76 mesh respectively with beveled gears 80 and 82 mounted for rotation about parallel axis. Shafts connected to the beveled gears 80 and 82 lead to one side of the indexing gear system and are operatively connected by gearing to the machine feed shaft or lead screw 78. As shown, a shaft 84 is keyed at one end to beveled gear 80 and is provided with keyed gears 86 and 88 adjacent to the opposite end thereof. A shaft 90 is keyed at one end to the beveled gear 82 and is provided with the keyed gear 92 disposed in the plane of the gear 86. Depending upon whether it is desired to rotate the shaft 40 in a plus or minus direction, the gear 92 is connected to the gear 86 by one or more idler gears as represented by the dotted lines connecting the two members together. Similarly, depending upon the amount of turning movement to be imparted to the shafts 16 and 40 for each increment of advance of the milling machine table, one or more gears of different sizes are connected between the gear 94 on the feed screw shaft 78 and the gear 88. As a result of the operative connections between the milling machine feed screw and the two handle shafts 16 and 40, it is possible to turn the blank the desired amount during each tooth cutting operation to form helical teeth on the blank.

The remaining figures in the drawings illustrate a practical adaptation of the system of Fig. 1 into an indexing unit or head for use on milling machines and the like. The moving parts schematically illustrated in Fig. 1 are either mounted in or alongside of a housing indicated at 100 which is cube shaped in general outline. The two indexing plates 10 and 12 are mounted on the front side 102 of the housing and in the same plane with one another as shown in Figs. 2 and 3. The initial indexing plate 10 is shown located centrally on the front face of the housing and the final adjusting indexing plate 12 is disposed above and to the left of the indexing plate 10. The work controlling spindle 30 projects from one side 104 of the unit. The two shafts 84 and 90 which are disconnectably coupled to the milling machine feed shaft 78 project from the opposite side 106 of the unit. Throughout the remaining figures the parts common to those illustrated and described in Fig. 1 are given the same reference numerals.

The differential mechanism generally referred to by reference numeral 22 is located in the forward section of the unit as shown in Fig. 4. Corresponding parts of this mechanism are referred to by the same reference numerals as applied to the schematic showing in Fig. 1. As further shown in Fig. 4 the shaft 24 which is driven from the differential extends rearwardly and has its rear end journalled for rotation in the back wall 108 of the unit. The worm 26 and the worm gear 28 operatively coupling the shaft 24 to the spindle 30 are shown located in the rear section of the unit.

The worm gear 54 is shaped differentially from that illustrated in Fig. 1. The gear teeth are mounted upon a peripheral portion of a cup-shaped member 110 in order to bring the teeth of the gear into the plane of the differential. The hub portion of the member 110 is secured to the larger gear 58 of the differential by any suitable means such as previously described in connection with Fig. 1. It is to be noted as explained in Fig. 1 that the beveled gears 74 and 76 shown in Fig. 4 mesh respectively with the beveled gears 80 and 82 shown in Fig. 5.

Fig. 6 illustrates the train of gears employed for operatively coupling the milling machine's feed shaft or lead screw 78 with the two handle control shafts 16 and 40. An important feature of the invention is the fact that the gear train forms part of the indexing head and is carried therewith whenever the head is moved. As previously explained in connection with Fig. 1 the gear 94 on the feed shaft 78 is operatively coupled with the gear 88 on the shaft 84 through an idler gear 112. This last gear is journalled for rotation about a stub shaft 114. The gear 92 on the outer end of the shaft 90 is operatively coupled to the shaft 84 through the intermediary of an idler gear 116 similarly journalled on a stub shaft 118. Gear 116 meshes with the gear 86 which is fixed to the shaft 84 and located below the gear 88 so that it is not visible in Fig. 6.

The two idler gears 112 and 116 are separately removably mounted upon a gear support which is capable of taking idler gears of various sizes in order to vary the ratio between the milling machine feed shaft 78 and the two shafts 84 and 90. One such gear mounting support is illustrated in Fig. 9 and comprises in general a plate 120 provided with a circular hole 122 adapted to fit over either shaft 84 or 90. The plate is provided with clamping means for securing the same to the shaft, such as two split sections 124 and 126 located in slightly spaced apart relationship to one another. The slit 128 which separates these two sections from one another opens radially into the hole 122 as shown in Fig. 9. Any suitable bolt and nut assembly indicated at 130 may be used to draw these two sections together to tighten the plate upon the shaft. Extending angularly away from one side of the axis of the hole 122 is a plate section 132 provided with two parallel slightly spaced apart slots 134 and 136. Receivable in either one of these slots are the stub shafts 114 and 118 previously described. In this manner idler gears of various sizes corresponding to the gears 112 and 116 may be removably supported upon the plate 120. The plate 120 is also provided with a projecting section 138 having an arcuate slot 140 therein whose center is on the axis of the hole 122. A suitable pin or other means projecting from the side wall 136 extends through the slot 140 and serves to limit the pivotal movement of the plate.

For tapered or angular work, one part of the unit containing the headstock spindle 30 is arranged for bodily movement in order to swing the spindle through an arc. Referring to Figs. 3, 4, 6 and 7, the rear section of the housing 100 is cut away to form a rectangularly shaped recess opening out on the top and opposite sides of the unit. The bottom of the recess is indicated at 142 and as shown in Fig. 4 as located adjacent to the bottom of the unit. The unit is divided interiorly by a transversely extending vertical wall 144 which forms the inner side of the recess. The back wall 108 of the unit forms the outer side of the recess. Located in the recess is a hollow rectangularly shaped member generally indicated at 146 including the top wall 148, bottom wall 150 and front and back walls 152 and 154 respectively. The body 146 has a transverse dimension less than that of the unit as shown by the dotted outline of the body in Fig. 7.

The entire body 146 is mounted for pivotal swinging movement about the axis of the shaft 24. For this purpose the front and back walls 152 and 154 thereof are shaped for rotatable support upon the shaft 24 on opposite ends of the worm 26 as shown in Fig. 4. The body is provided on the back wall with an arcuate opening or groove 155 having a curved toothed rack 156 with which a pinion 158 is engageable. The pinion is fixed to the inner end of a stub shaft 160 which projects through the back wall 108 of the unit to the outside thereof and is provided with a knurled adjusting member 162 for rotating the pinion 158. The rack 156 has an axis of curvature corresponding to the axis of the shaft 24. It is evident that upon rotation of the knurled control member 162 that the pinion 158 will cause the body 146 to swing in an arcuate path of movement about the axis of the shaft 24.

In order to releasably lock the body 146 in horizontal position there is provided as shown in Fig. 6 a conical shaped recess 164 opening rearwardly from the back wall 154 thereof. Engageable in the recess 164 is tapered pin 166 fixed to the end of a rotatable member 168 having external threads engaging in the back wall 108 of the unit. The outer end of the member 168 projects through the back wall and is provided with a knurled control handle 170 which upon rotation in one direction will axially advance the member 168 and its tapered extremity 166 into wedging engagement with the recess 164. When those operate, the member 168 will releasably lock the body 146 in the position shown in the drawings with the axis of the spindle 30 extending horizontally. When the member 168 is turned to released position, the body 146 may be adjustably rotated about the axis of the shaft 24 by rotating knob 162 and project the axis of the spindle 30 at any desired angle between a horizontal and vertical position. Suitable clamping means may be provided for holding the body in angular position to which it is adjusted.

Suitable scale means is provided between the movable body 146 and the unit. As shown in Fig. 7 the back wall 108 of the unit is provided with an arcuate scale 172 which is adapted to cooperate with a scale 174 on the body to indicate the extent of angular movement thereof about the axis of the shaft 24.

As the result of the provision of two index plates and associated control devices therefor, it is possible to employ index plates having a single circular row of holes or recesses with which the handles 20 and 44 are engaged instead of being almost completely covered with index holes as has heretofore been the practice. Figs. 12 and 13 illustrate an index plate 175 of this character constructed with one circular series of holes 176.

An index plate modified for micrometer adjustment is illustrated in Figs. 10 and 11. Such a plate may be substituted for either one or both of the index plates 10 and 12 previously described. Referring to Figs. 10 and 11, the index plate proper of the micrometer assembly is indicated at 178. It is provided with a circular groove 180 in its outer face with which a spring loaded pin 181 of a handle 182 is engageable. The handle is mounted on a crank arm 184 secured to the outer end of a shaft 186 which may correspond with shafts 16 and 40 previously described. Mounted on the front side of the plate 178 is a second smaller plate 188 which has an external diameter less than the circular groove 180. The outer edge of the plate 188 is reduced in thickness throughout its circular extent and mounted in the place provided thereby is a ring member 190. Projecting radially away from one side of the ring member is an arm 192 having a semi-circular recess 194 shaped for contactually engaging the pin 181 of the handle throughout its extent. The ring member 190 is adapted to be clamped in any circularly adjusted position by means of a set screw 196 threaded in the smaller plate 188 and having its head in overlapping relationship on the ring member for frictionally clamping the latter in position.

Carried on the perimeter of the index plate 178 is an arcuately shaped member 198 having sliding contact with the edge of the plate. Projecting radially inwardly from the member 198 is an arm 200 provided with a semi-circular recess 202 disposed in opposed relationship to the circular recess 194 previously described. Carried by the arm 202 is an outwardly projecting ear 204 into which is threaded a stud 206 extending substantially tangentially to the periphery of the index plate. The opposite end of the stud is journalled in an outwardly projecting gear 208 fixed to an arcuate member 210 similarly slidably mounted on the periphery of the index plate as arcuate member 198. Carried by the stud 206 and fixed thereon is a knurled manual control member 212. The threaded stud 206 connects the two arcuate members 198 and 210 for joint movement around the periphery of the index plate, but rotation of the connecting stud effected by the knurled control element 208 will either draw the arcuate members together or separate one from the other. Carried by member 198 is a set screw 214 which will clamp the same to the index plate against movement. Similarly carried by the arcuate member 210 is a set screw 216 for locking the same to the index plate against movement.

In the use of the micrometer indexing plate assembly the two arms 192 and 210 are brought together around the cylindrical portion of the spring loaded pin 181 of the handle and the set screw 190 is threaded to tightly clamp these two arms around the pin so that the pin is restrained from any movement relative to the arms. Thereafter the two arcuate members are jointly moved together around the perimeter of the index plate, carrying the handle 182 and shaft 186 therewith, to the desired position as indicated by the scales thereon. After an approximate adjustment has been made the locking screw 216 is tightened thereby locking the member 210 to the index plate. Following this the knurled control member 212 is rotated in one direction or the other to shift the other arcuate member 198 and the handle to the exact position desired and when this is obtained the locking screw 214 is tightened to lock the member 198 to the index plate.

What I claim is:

1. An indexing device for use on a milling machine or the like comprising, in combination, a pair of index plates, a handle controlled shaft extending through each index plate, means optionally providing either independent rotation of each shaft relative to its index plate or joint rotation of the two together, a work piece turning spindle, a differential gear mechanism, means operatively coupling said spindle and said shafts to the differential mechanism for cumulatively transmitting the separate turning movements of the shafts to the spindle, a milling machine feed shaft, and gear means for operatively coupling each index plate to said feed shaft for turning the index plates proportional to the rotation of the feed shaft.

2. In an indexing device for milling machines, a differential gear mechanism including a pair of opposed sun gears independently rotatable about a common axis and one or more planetary gears interposed between and engaging said sun gears, said one or more planetary gears being rotatable about axes extending perpendicularly to said common axis and revolvable thereabout while maintaining engagement with said sun gears, a rotatable work blank turning spindle, a main indexing shaft operatively connected to one of said sun gears and operable through the differential mechanism to turn the spindle, and a supplementary indexing operatively connected to the other of said sun gears and operable through the differential mechanism to supplement the settings of the main index shaft.

3. An index head for use on milling machines and the like comprising, in combination, a substantially closed housing having top and bottom and side walls adapted to be mounted on a milling machine, a differential gear mechanism located in the interior of the housing including a pair of opposed gears independently rotatable about a common axis and one or more differential gears interposed between and engaging said pair of opposed gears, said one or more differential gears being rotatable about axes extending perpendicularly to said common axis and adapted to revolve about the common axis while maintaining engagement with said opposed gears, a rotatable mounted work blank turning spindle projecting from one side wall of the housing, a pair of index plates having their respective axes extending parallel to one another and mounted on the outside of another side wall of the housing, a rotatable shaft extending through each index plate and entering the interior of the housing, a handle on the outer end of each shaft for turning the same and having means for releasably locking the handle and the shaft to the index plate with which it is associated in any one of a plurality of positions circularly spaced about the axis of the index plate, means in the housing operatively coupling one of said shafts to one of said opposed gears of the differential mechanism and effecting rotation of the gear proportionate to the turning movement of the shaft, means in the housing operatively coupling the other of said shafts to the other of said opposed gears of the differential mechanism and effecting rotation of the gear proportionate to the turning movement of the shaft but at a ratio differing from that of said first means, and means in the housing operatively coupling said work blank turning spindle with said one or more rotatable and revolvable gears of the differential mechanism and rendering the spindle responsive to the cumulative turning movement of the two shafts.

4. An index head for a milling machine and the like comprising, in combination, a substantially closed housing having a top and bottom and side walls, a rotatable work piece turning spindle projecting from one side wall of the housing, a pair of rotatable index plates mounted in exposed position on another side wall of the housing, a handle controlled shaft extending through each index plate and entering the interior of the housing, means for providing joint rotation of each shaft with its respective index plate, a differential gear mechanism mounted in the housing and operatively coupled to the two shafts and to the spindle for cumulatively transmitting the separate turning movements of the shaft to the spindle, a pair of driving shafts projecting from another side wall of the housing, means operatively connecting one of said driving shafts with one of the index plates and the other driving shaft with the remaining index plate, and interchangeable gear means supported on the outside of the side wall of the housing through which said driving shafts project for operatively coupling the driving shafts to a feed shaft on the milling machine.

5. In an indexing device for milling machines, a differential gear mechanism including a pair of opposed sun gears independently rotatable about a common axis and one or more planetary gears interposed between and engaging said sun gears, said one or more planetary gears being rotatable about axes extending perpendicularly to said common axis and revolvable thereabout while maintaining engagement with said sun gears, a work blank turning spindle, means mounting said spindle for rotation about its axis and for bodily shiftable movement in an arcuate path about said common axis as a center, a main indexing shaft operatively connected to one of said gun gears and operable through the differential mechanism to turn the spindle on its axis, a supplemental indexing shaft operatively connected to the other of said sun gears and operable through the differential mechanism to turn the spindle and supplement the setting of the main shaft, and means for bodily shifting the spindle in its arcuate path about said common axis and for holding the spindle in its bodily adjusted position.

ENDRE KIRÁLY.

REFERENCES CITED

The following references are of record in the file of this patent:

UNITED STATES PATENTS

| Number | Name | Date |
| --- | --- | --- |
| Re. 17,959 | Bachman | Feb. 10, 1931 |
| 1,295,363 | Parker | Feb. 25, 1919 |
| 1,784,593 | Hild | Dec. 9, 1930 |
| 2,205,361 | Kearney | June 18, 1940 |
| 2,228,583 | Parsons | Jan. 14, 1941 |